S. WILLIAMS.
COTTON CLEANER.
APPLICATION FILED OCT. 18, 1911.
1,029,162.
Patented June 11, 1912.
4 SHEETS—SHEET 1.
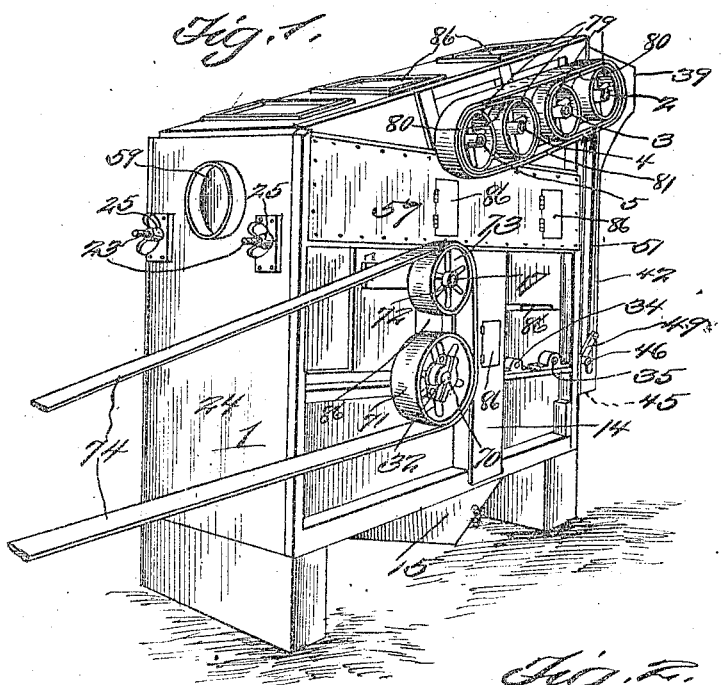
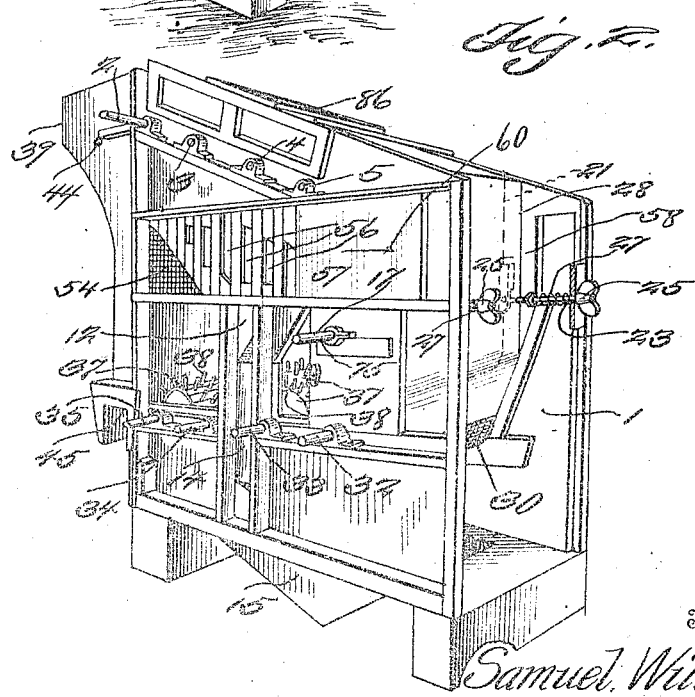
Witnesses
Inventor
Samuel Williams
By D. Swift & Co.
Attorney

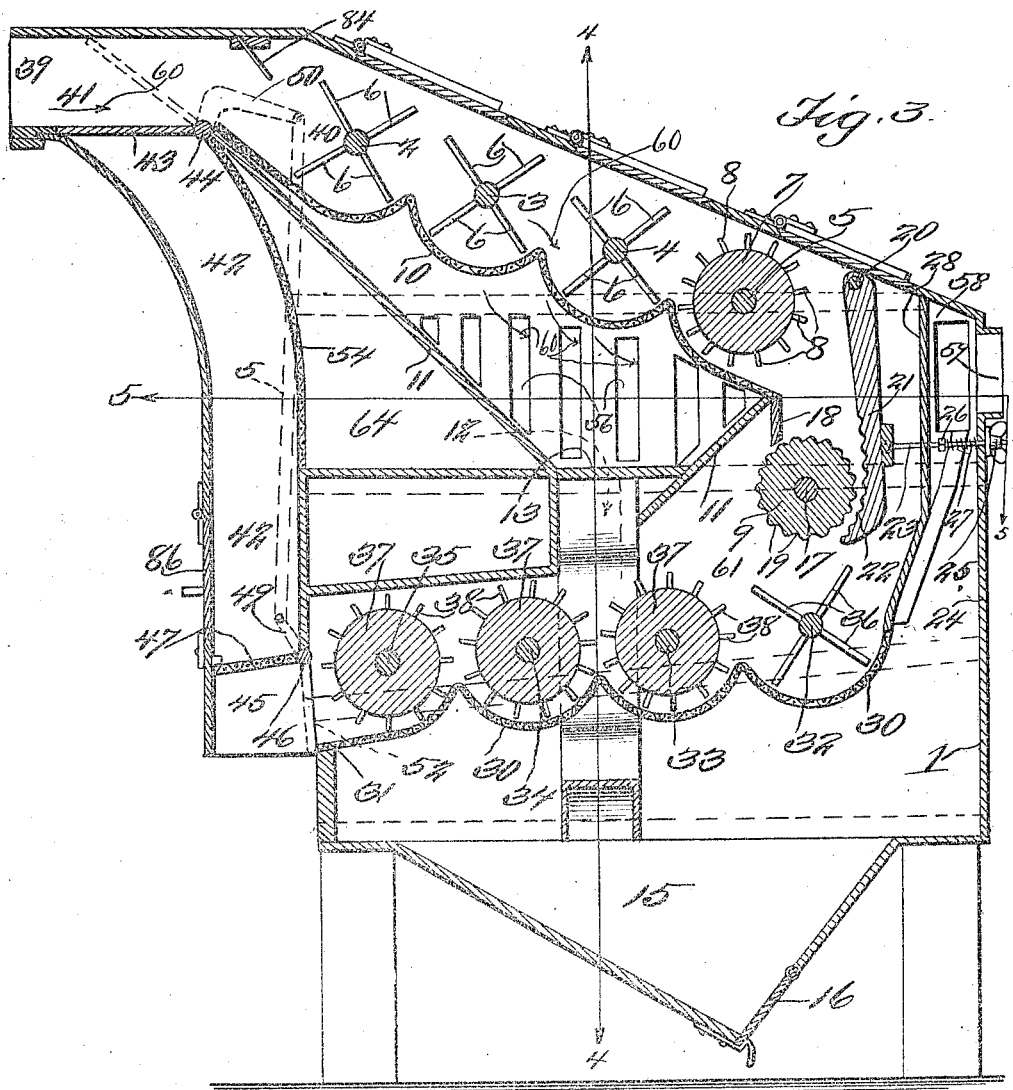

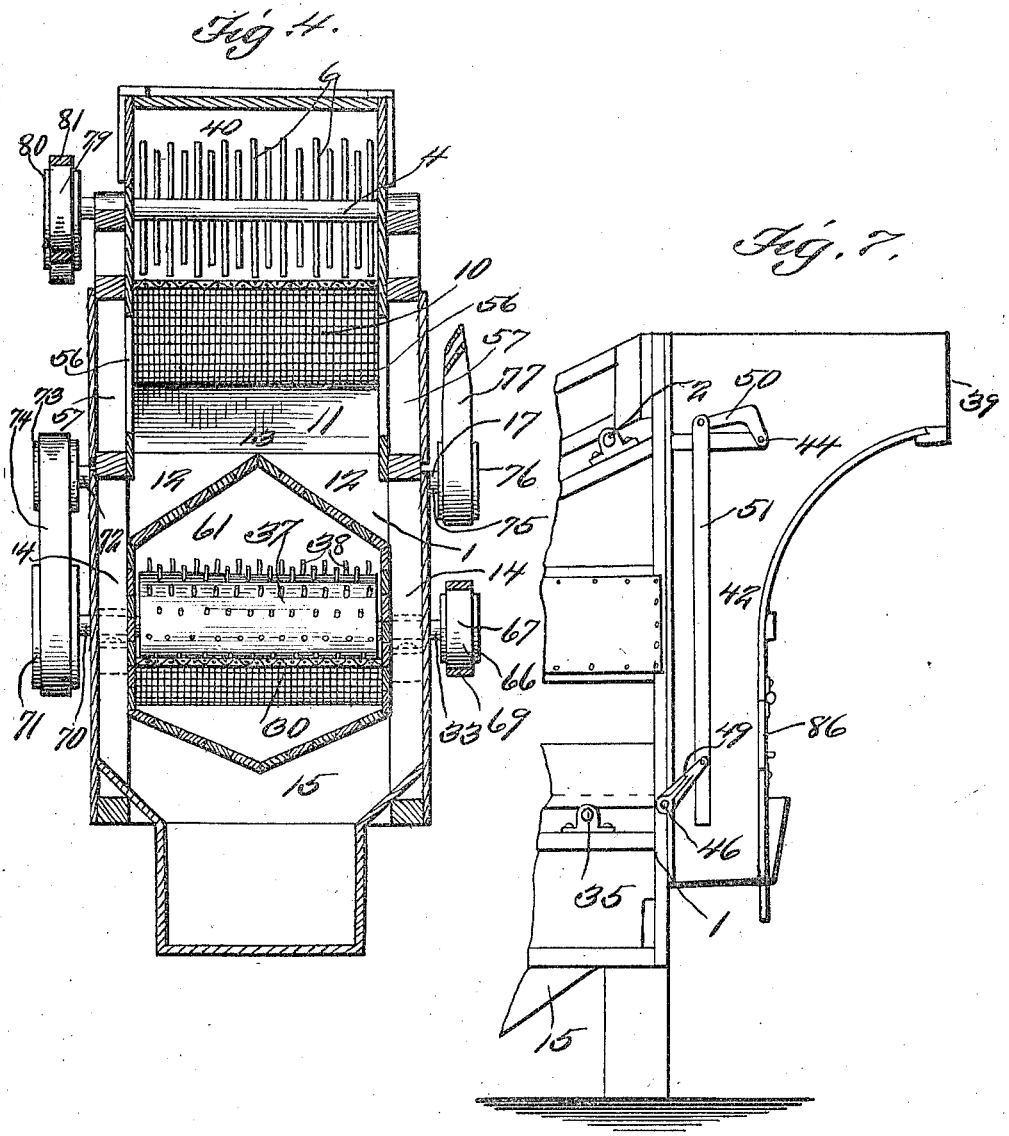

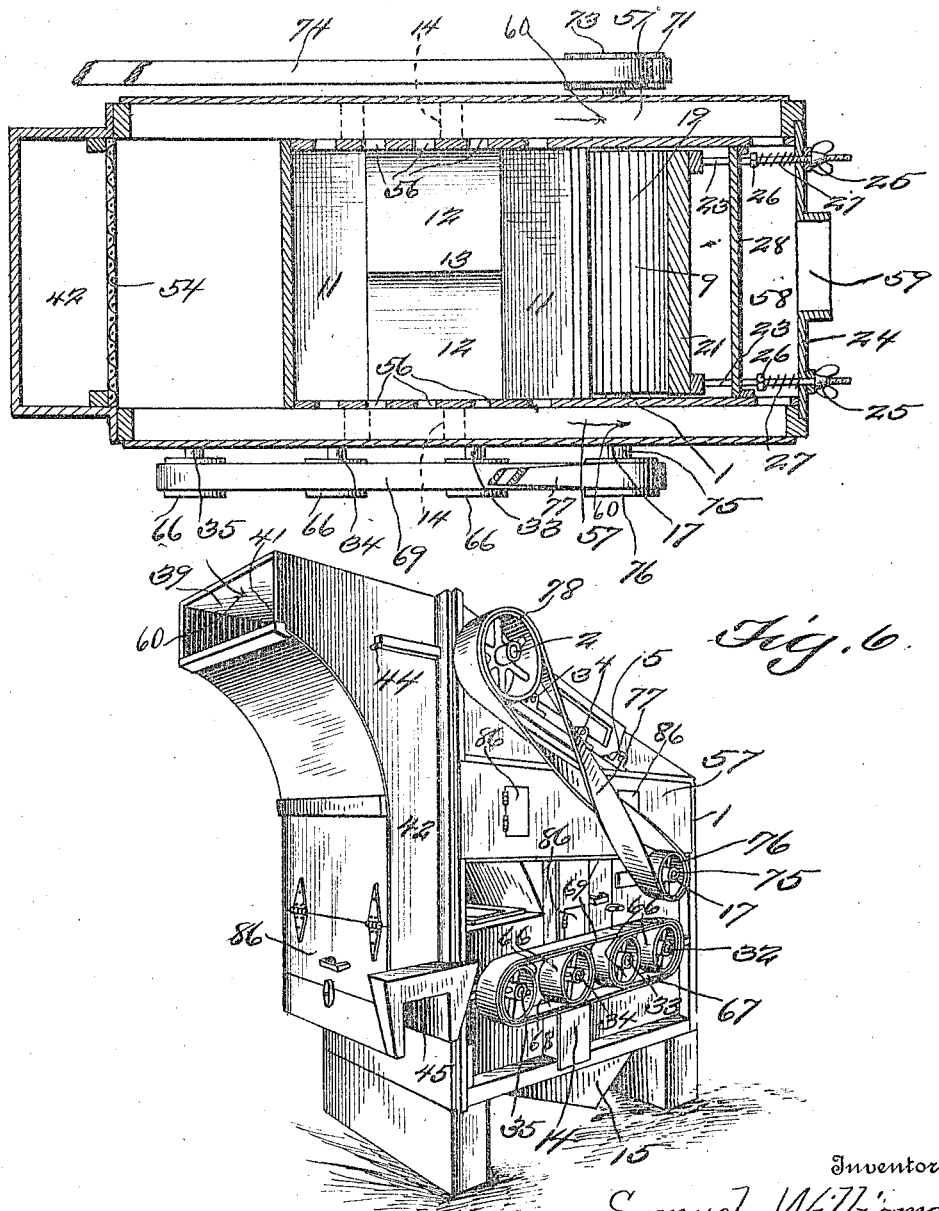

UNITED STATES PATENT OFFICE.

SAMUEL WILLIAMS, OF ELK CITY, OKLAHOMA.

COTTON-CLEANER.

1,029,162.    Specification of Letters Patent.    Patented June 11, 1912.

Application filed October 18, 1911. Serial No. 655,404.

*To all whom it may concern:*

Be it known that I, SAMUEL WILLIAMS, a citizen of the United States, residing at Elk City, in the county of Beckham and State of Oklahoma, have invented a new and useful Cotton-Cleaner; and I do hereby declare the following to be a full, clear, and exact description of the invention, such as will enable others skilled in the art to which it appertains to make and use the same.

This invention relates to a new and useful combined cotton cleaner and cotton boll crusher.

When the weather in the fall first reaches a freezing point, there is, as a general thing a great many bolls of cotton in matured conditions on the stalks. These bolls of cotton at this time of the year lose their opening power, on account of becoming frozen. These bolls have a good quality of cotton on their interior, and after they have thoroughly dried out, the bolls may be crushed.

The principal object of the invention is the provision of an apparatus including means for cleaning, and crushing these bolls, and separating the refuse therefrom, and finally cleaning the cotton after the bolls are crushed, so that the cotton is in a proper condition to be ginned.

A further object of the invention is the production of an apparatus for cleaning cotton generally, and separating the refuse therefrom.

In the drawings there is disclosed a certain structure of apparatus, but in practical fields this structure may necessitate alterations, to which the patentee is entitled, provided the alterations are comprehended within the scope of what is claimed.

The invention comprises further features and combination, as hereinafter set forth, shown in the drawings and claimed.

In the drawings: Figure 1 is a view in perspective of a cotton cleaning apparatus constructed in accordance with the invention. Fig. 2 is a similar view, looking from the opposite side of the apparatus, showing parts removed, so as to illustrate certain interior features, and the course of the air currents. Fig. 3 is a vertical sectional view through Fig. 1. Fig. 4 is a sectional view on line 4—4 of Fig. 3. Fig. 5 is a sectional view on line 5—5 of Fig. 3. Fig. 6 is a view similar to Fig. 2, but showing the machine complete and looking at the sides thereof opposite to that shown in Fig. 1. Fig. 7 is a fragmentary detail view of a portion of the apparatus, showing the means for operating two valves together, for deflecting the cotton, when it is desired not to permit it to enter the cleaning portion of the apparatus.

Referring to the drawings 1 designates the frame or casing of the apparatus, which is preferably of the shape shown in the drawings. Journaled in the frame or casing are the shafts 2, 3, 4 and 5. Movable with the shafts 2, 3, and 4 are the cotton or boll beaters 6, while on the shaft 5, a picker roller 7 is fixed. The roller 7 is solid, and provided with a plurality of radial picker fingers 8. The object in making the cotton picking roller solid, is to provide means to obviate the air currents from continuing on with the cotton to the crusher roller 9.

Arranged below the cotton beaters 6 and the cotton picking roller 7 is a screen 10, which conforms partially to the shape of the beaters and the picking rollers. As the cotton and the bolls are broken and picked, the refuse therefrom passes through the screen 10. The refuse or dirt strikes the inclined board or chute 11, and then passes through the passage 12. At the point 13 this passage 12 divides, and empties into the chutes 14, one on each side of the apparatus. The chutes 14 converge toward one another and empty into the refuse box 15, access to which may be had through the door 16.

The crusher roller 9 is journaled on the shaft 17, adjacent the partition 18. This roller 9 is corrugated, as shown at 19. Pivoted at 20 is a rub board 21, the lower end of which is curved, to conform to the contour of the crushing roller 9. The lower curved surface of the rub board is provided with a plurality of corrugations 22 to coöperate with the corrugations of the crusher roller 9. Pivoted to the rub board is a pair of rods 23, which extend through the rear portion 24 of the casing. On the ends of the rods 23 nuts 25 are threaded. Between the nuts 26 (which are threaded on the rods 23) and the rear portion 24 of the casing are springs 27. By this construction the rub board is held yieldably with relation to the cotton or the bolls as they pass between the crusher roller 9 and the rub board, in order to obviate the apparatus from becoming choked. As the cotton or the bolls pass between the crusher roller 9 and the rub board, a crushing rolling motion is imparted to them, thus breaking them into their natural parts. This is accomplished without tearing them apart to the extent that it would place the shale or woody substance into the lint, because of the fact that the rub board is held yieldably with relation to the bolls.

Between the rub board and the rear portion 24 is a partition 28.

The rub board may be thrown out of coöperation with the crusher roller 9, by adjusting the nuts 25.

Secured to the lower end of the partition 28 is a screen 30, the forward end of which is secured at 31 to the casing. Fixed in the casing are shafts 32, 33, 34 and 35. Movable with the shaft 32 is a cotton beater 36, which is similar to the beaters 6. Movable upon the shafts 33, 34 and 35 are additional cotton picking rollers 37. These rollers 37 are solid as shown and are provided with radially extending cotton picking fingers 38. The screen 30, however, conforms to the shape of the beater 36 and the rollers 37.

The casing is provided with an inlet mouth 39, through which the cotton or the bolls pass into the chamber 40, where the beaters 6 and the roller 7 are arranged. Leading off from the passage 41 of the inlet mouth is a curved passage or chute 42. Where the passages 41 and 42 adjoin a valve 43 is arranged, the same being pivoted at 44.

After the cotton or the bolls have been thoroughly cleaned and crushed, the cotton leaves the apparatus through the outlet 45, while the refuse or dust or dirt is separated and delivered into the refuse box 15.

Extending transversely of and at the lower portion of the passage 42 is a rod 46, and movable therewith is a screen valve 47. The rod 46 and the pivot rod 44 of the valve 43, on one end of each is provided with arms 49 and 50. These arms extend exactly in opposite direction, so that by pressing the arms downwardly simultaneously by taking hold of the link 51, the valve 43 will be raised, while the screen valve 47 will be lowered. When the screen valve 47 is lowered, the cotton exit 52 is closed.

Should it be desired not to pass the cotton through the cleaner and the crusher, the valve 43 may be raised in the manner above described, as shown in dotted lines in Fig. 3. When raising the valve 43 as shown in dotted lines, the cotton will be deflected through the chute or passage 42 against the screen 54, through which the air currents pass, while the cotton drops directly through the passage 42 through the outlet 45.

The cotton or the bolls are drawn through the passage 41 into the chamber 40, where they are treated by the beaters 6. The cotton is then picked by the roller, which acts as an abutment for the air currents. As the cotton is so far treated the air currents are scattered through the screen 10 and thence through the openings 56 into the passages 57, one on each side of the machine. The air passes through these passages 57 into the chamber 58, and through the opening 59 at the rear of the casing. A suction pipe (not shown) may be connected with the opening 59 at the rear of the casing. This suction pipe is designed to connect with the suction side of a fan (not shown), so as to cause a suction in the pipe and through the machine, between the beaters 6 and the screen 7 and through the passage ways 57, and then exit through the opening 59, as indicated by the arrows 60, so as to draw the cotton through the machine in its proper course. By making the picking roller 7 solid the air to some extent is prevented from entering the chamber 61. In this manner the picking rollers 37, the beater 36, and the crusher roller 9 operate in a vacuum space or approximately a vacuum space, so as to permit the beater 36 and the picking roller 37 to more thoroughly perform their work.

When the valve 43 is raised and the cotton is deflected through the passage or chute 42 the air passes through the screen 54 into the space 64, and thence into the passage 57, from which it leaves the apparatus by way of the chamber 58 and the opening 59.

On one end of each of the shafts 32, 33, 34 and 35 a pulley 66 is fixed. The pulleys of the shafts 32 and 33 are belted together by the belt 67, while the pulleys of the shafts 34 and 35 are belted together by the belt 68. Traveling about the belts 67 and 68, and over the pulleys of the shafts 32 and 35 is a longer belt 69. Fixed on and movable with the ends 70 of the shaft 32 is a pulley 71, while fixed on the end 72 of the shaft 17 is a pulley 73. Passing about the pulley 71 and 73 is the drive belt 74, by which power is transmitted to the apparatus. When the shaft 32 is rotated the shafts 33, 34 and 35 are in turn rotated in unison. The shaft 17 is rotated at the same time the shaft 32 rotates, by virtue of the belt 74. On the end 75 of the shaft 17 a pulley 76 is fixed, about which the belt 77 travels, which in turn moves about the pulley 78, carried by and movable with the shaft 2 of the uppermost beater 6. The shafts 2, 3, 4 and 5 are belted together similar to the shafts 32, 33, 34, and 35, by means of the pulleys 79, and belts 80, and 81. It will be seen that as the shaft 2 is rotated by means of the belt 77, the shafts, 3, 4 and 5 are in turn operated in unison. The drive belt 74 may be connected to any desired source of power, either to the main line shaft of a gin plant (not shown), or to a counter shaft (not shown).

Arranged in the passage 41, just beyond the valve 43 is a row of spikes or projections 84. The spikes or projections are arranged crosswise of the machine, and disposed at an angle as shown. These spikes may be of any desired length and spaced any desired distances apart. The object of providing these spikes or projections is to catch or retard all large or heavy lots of cotton, that may come into the machine adheringly together. These spikes or projections separate the large or heavy lots of cotton and deflect them down on the screen 10 under the beaters 6, thus avoiding any choking or chugging of the machine, by having too much cotton delivered to the front beater at one time. The action of checking the cotton tends also to close up the suction, to check the air current, and keep it from bringing too much cotton into the machine, until the passage way is cleared to a certain extent.

The casing of the apparatus is provided with a plurality of doors 86 which may be opened or removed, so as to have access to the machine for cleaning purposes.

The invention having been set forth, what is claimed as new and useful is:—

1. In an apparatus as set forth, a casing having an upper and lower chamber adjoining at one end, cotton cleaning mechanisms in the chambers, means for conveying the air from the upper chamber to the rear of the casing where it exits, and an air conduit between the upper chamber and the lower chamber, thus causing approximate vacuum in lower chamber.

2. In an apparatus as set forth, a casing having upper and lower chambers adjoining at one end, cotton cleaning mechanisms in the chambers, means for conveying the air from the upper chamber to the rear of the casing where it exits, and an air conduit from the lower chamber to the exit, thus causing approximate vacuum in the lower chamber, and a crushing mechanism arranged at the point where the chambers adjoin.

3. In a machine as set forth, a casing having an upper chamber with a plurality of beaters operable therein, screening arranged below the beaters, a chute below the screening, down which the refuse passes, a second chamber with beaters therein in the lower portion of the casing, passage ways merging from the chute and from one another at their upper portions, one upon each side of the lower chamber, through which the refuse passes, a pair of passages in the casing, one on each side thereof communicating with the space between the screening and the chute, and extending to and merging together at the rear of the casing, through which the air is adapted to be drawn by suction thereby causing a vacuum in the lower chamber, and a refuse box below the casing to receive the refuse from the first passages.

4. In a cotton cleaner, a series of rotary beaters, a corrugated roller and rub-board adapted to operate upon the cotton after leaving the beaters, a series of rotary pickers adapted to operate upon the cotton after leaving the corrugated roller, said beaters, corrugated roller and rub-board being mounted in a casing with screening means in connection with the beaters and picker rolls, and means for carrying away refuse.

5. In a cotton cleaner, a series of rotary beaters followed by a single picker, a corrugated roller and rub-board adapted to operate upon the cotton after leaving the beaters and the single picker, a series of rotary pickers preceded by a single beater adapted to operate upon the cotton after leaving the corrugated roller, said beaters, pickers, corrugated roller and rub-board being mounted in a casing with screening means in connection with the beaters and picker rolls, and means for carrying away refuse.

6. In a cotton cleaner, a series of rotary beaters, a corrugated roller and rub-board adapted to operate upon the cotton after leaving the beaters, a series of rotary pickers adapted to operate upon the cotton after leaving the corrugated roller, said beaters, corrugated roller and rub-board being mounted in a casing with screening means in connection with the beaters, and picker rolls, means for carrying away refuse, and means for causing an approximate vacuum in the cleaner.

7. In a cotton cleaner, a series of rotary beaters followed by a single picker, a corrugated roller and rub-board adapted to operate upon the cotton after leaving the beaters and the single picker, a series of rotary pickers preceded by a single beater adapted to operate upon the cotton after leaving the corrugated roller, said beaters, pickers, corrugated roller and rub-board being mounted in a casing with screening means in connection with the beaters and picker rolls, means for carrying away refuse, and means for causing an approximate vacuum in the cleaner.

8. In a cotton cleaner, a series of rotary beaters followed by a single picker, a corrugated roller and yieldable rub-board adapted to operate upon the cotton after leaving the beaters and the single picker, a series of rotary pickers preceded by a single beater adapted to operate upon the cotton after leaving the corrugated roller, said beaters, pickers, corrugated roller and rub-board being mounted in a casing with screening means in connection with the beaters and picker rolls, means for carrying away refuse, means for causing an approximate vacuum in the cleaner, and means for operating the beater and picker rolls and the corrugated roller coördinately.

In testimony whereof I have signed my name to this specification in the presence of two subscribing witnesses.

SAMUEL WILLIAMS.

Witnesses:
F. G. BUMBERGER,
C. J. HOLVERSON.